(12) United States Patent
Lam et al.

(10) Patent No.: US 6,917,569 B1
(45) Date of Patent: Jul. 12, 2005

(54) METHOD FOR DETERMINING SEEK TIMES IN A DISK ARRAY STORAGE DEVICE

(75) Inventors: Tao Kai Lam, Boston, MA (US); Ruben Michel, Hopkinton, MA (US); Eitan Bachmat, Lehavim (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/541,159

(22) Filed: Mar. 31, 2000

Related U.S. Application Data (63) Continuation-in-part of application No. 09/002,428, filed on Jan. 2, 1998, now Pat. No. 6,088,766, which is a continuation-in-part of application No. 08/944,606, filed on Oct. 6, 1997, now Pat. No. 6,061,761.

(51) Int. Cl.[7] .............................................. G11B 21/08
(52) U.S. Cl. ............................ 369/30.15; 369/47.49; 369/53.34; 369/59.25; 360/78.04; 360/73.03
(58) Field of Search .......................... 369/30.16, 30.17, 369/44.25, 30.15, 27.01, 30.01, 30.12, 53.17, 47.49, 53.34, 59.25; 360/78.04, 73.03, 74.1, 77.04; 710/5, 39, 40; 713/401, 502; 711/112

(56) References Cited

U.S. PATENT DOCUMENTS

| | | | | |
|---|---|---|---|---|
| 5,111,444 A | * | 5/1992 | Fukushima et al. | 369/53.17 |
| 5,245,595 A | * | 9/1993 | Yasukawa | 369/30.12 |
| 5,313,617 A | * | 5/1994 | Nakano et al. | 703/24 |
| 5,381,282 A | * | 1/1995 | Arai et al. | 360/78.07 |
| 5,566,148 A | * | 10/1996 | Takahara et al. | 360/78.07 |
| 5,570,332 A | * | 10/1996 | Heath et al. | 360/78.04 |
| 5,696,646 A | * | 12/1997 | Satoh | 360/78.04 |
| 5,828,902 A | * | 10/1998 | Tanaka et al. | 710/39 |
| 5,886,846 A | * | 3/1999 | Pham et al. | 360/78.04 |
| 6,493,175 B1 | * | 12/2002 | Carlson | 360/78.04 |
| 6,515,817 B1 | * | 2/2003 | Hamaguchi et al. | 360/73.03 |

\* cited by examiner

Primary Examiner—Tan Dinh
Assistant Examiner—Kim-Kwok Chu
(74) Attorney, Agent, or Firm—George A. Herbster (57) ABSTRACT

Optimizing performance of physical disk drives in a disk array storage device with a plurality of logical volumes is accomplished by accumulating statistics over an interval to select two logical volumes for an exchange. After testing to determine any adverse effect of making that change, the exchange occurs to more evenly distribute the loading on individual physical disk storage devices. One set of statistics, seek time, is obtained by combining estimated disk access information and an interpolated seek time obtained from a template that stores characteristics seek times among different pairs of segments that define a physical disk device independently of a logical volume configuration.

20 Claims, 8 Drawing Sheets

| MEASURED SEEK TIMES (msec) | | | | | INITIAL ADDRESS (GB) |
|---|---|---|---|---|---|
| TARGET ADDRESS (GB) | | | | | |
| 0 | 1 | 2 | 3 | 4 | |
| | 3.0 | 3.2 | 3.4 | 3.8 | 0 |
| | | 3.1 | 3.5 | 3.6 | 1 |
| | | | 3.3 | 3.5 | 2 |
| | | | | 3.35 | 3 |

| MEASURED SEEK TIMES (msec) | | | | | INITIAL ADDRESS (GB) |
|---|---|---|---|---|---|
| TARGET ADDRESS (GB) | | | | | |
| 0 | 1 | 2 | 3 | 4 | |
| | 3.0 | 3.2 | 3.4 | 3.8 | 0 |
| | | 3.1 | 3.5 | 3.6 | 1 |
| | | | 3.3 | 3.5 | 2 |
| | | | | 3.35 | 3 |

| MEASURED SEEK TIMES (msec) | | | | | INITIAL ADDRESS (GB) |
|---|---|---|---|---|---|
| TARGET ADDRESS (GB) | | | | | |
| 0 | 1 | 2 | 3 | 4 | |
| 2.8* | 3.0 | 3.2 | 3.4 | 3.8 | 0 |
| | 2.9* | 3.1 | 3.5 | 3.6 | 1 |
| | | 3.05* | 3.3 | 3.5 | 2 |
| | | | 3.15* | 3.35 | 3 |
| | | | | 3.20* | 4 |

METHOD FOR DETERMINING SEEK TIMES IN A DISK ARRAY STORAGE DEVICE

CROSS REFERENCE TO RELATED APPLICATION

This is a continuation-in-part of application for U.S. Pat. No. 6,088,766 granted Jul. 11, 2000 (Ser. No. 09/002,428 filed Jan. 2, 1998) that is a continuation-in-part of application for U.S. Pat. No. 6,061,761 granted May 2, 2000 (Ser. No. 08/944,606 filed Oct. 6, 1997) and that is assigned to the same assignee as this invention.

BACKGROUND OF THE INVENTION

1. Field of the Invention

This invention generally relates to the management of resources in a data processing system and more particularly to a tool for use in the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or physical disk drives with the capability of storing terabytes of data. The management of such resources becomes very important because the ineffective utilization of the capabilities of such an array can affect overall data processing system performance significantly.

Generally a system administrator will, upon initialization of such a direct access storage device, determine certain characteristics of the data sets to be stored. These characteristics include the data set size, and volume names and, in some systems, the correspondence between a logical volume and a particular host processor in a multiple host processor system. The system administrator uses this information to configure the disk array storage device by distributing various data sets across different physical disk devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem involves an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having an affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In still another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis uses the count and time interval to estimate the utilization of each device due to the current tasks. An estimate is also made with the anticipated utilization due to the task undergoing allocation. The estimated current and anticipated utilization serve as a basis for the allocation of data sets to the least utilized I/O devices.

Yet another load balancing approach involves a division of reading operations among different physical disk drives that are redundant. Redundancy has become a major factor in the implementation of various storage systems and must also be considered in configuring a storage system. U.S. Pat. No. 5,819,310 to Vishlitzky, et al. discloses such a redundant storage system with a disclosed disk array storage device that includes two device controllers and related physical disk drives for storing mirrored data. Each of the physical disk drives is divided into logical volumes. Each device controller can effect different reading processes and includes a correspondence table that establishes the reading process to be used in retrieving data from the corresponding physical disk drive. Each disk controller responds to a read command that identifies a logical volume by using the correspondence table to select the appropriate reading process and by transferring data from the appropriate physical disk drive containing the designated logical volume.

Consequently, when this mirroring system is implemented, reading operations involving a single logical volume do not necessarily occur from a single physical disk drive. Rather read commands to different portions of a particular logical volume may be directed to any one of the mirrors for reading from preselected tracks in the logical volume. Allowing such operations can provide limited load balancing and can reduce seek times.

Other redundancy and striping techniques may spread the load over multiple physical drives by dividing a logical volume into sub-volumes that are stored on individual physical disk drives in blocks of contiguous storage locations. However, if the physical disk drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

Recently more rigorous analyses have been implemented to provide dynamic reallocation based upon actual usage. U.S. Pat. No. 6,189,071 granted Feb. 13, 2001 (application Ser. No. 09/143,683 filed, Aug. 28, 1998) discloses one such analysis that includes the step of providing an approximation of disk seek times. Generally these approaches determine seek distances and convert the seek distances into time. In more specific terms, this approach uses a statistical analysis by which actual disk accesses are weighted and combined to produce an estimated seek activity. Then this estimate is converted to a seek time by combination with a value, $t_{i,j}$, that is an approximation of the seek time between two logical volumes i and j. However, in some applications it may be desirable to obtain more accurate seek times to use in selecting exchangeable logical volumes that, in turn, can optimize the performance of a disk array storage device.

SUMMARY

Therefore it is an object of this invention to provide a tool that is useful in the dynamic reallocation of data on a disk array storage device based upon actual usage.

Another object of this invention is to provide dynamic reallocation of a disk array storage device utilizing statistical analyses based, in part, on better approximations of disk seek times.

Still another object of this invention is to provide a dynamic reallocation of a disk array storage device by providing a method for generating disk seek times directly from normally collected disk statistics based upon physical disk drive operating characteristics.

Yet another object of this invention is to provide a statistical analysis that includes a process for generating disk seek times that more accurately reflect actual disk seek times thereby to facilitate the optimization of performance.

In accordance with this invention, the seek time required for moving a disk head between first and second addresses includes a step of dividing the disk into a plurality of segments of a given size defined by first and second boundaries and establishing an array of actual seek times for seek operations between each pair of segments. The specified first and second addresses and seek times in the array are combined to obtain an actual seek time.

In accordance with another aspect of this invention the seek time for a physical disk drive configured to store data in a plurality of logical volumes over a time interval is determined by dividing the physical disk into a plurality of fixed sized segments. Segment size is independent of the logical volume configuration on the physical disk drive. The actual time required for seek operations between the segments is obtained. Access statistics for each logical volume during the time interval are accumulated and converted into an estimated number of seeks between each pair of logical volumes. A characteristic seek time for each logical volume pair is obtained based upon actual segment seek times. The a total seek time is generated as the sum of the products, for each logical volume pair, of the characteristic seek time and the estimated number of seeks for the logical volume pair.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
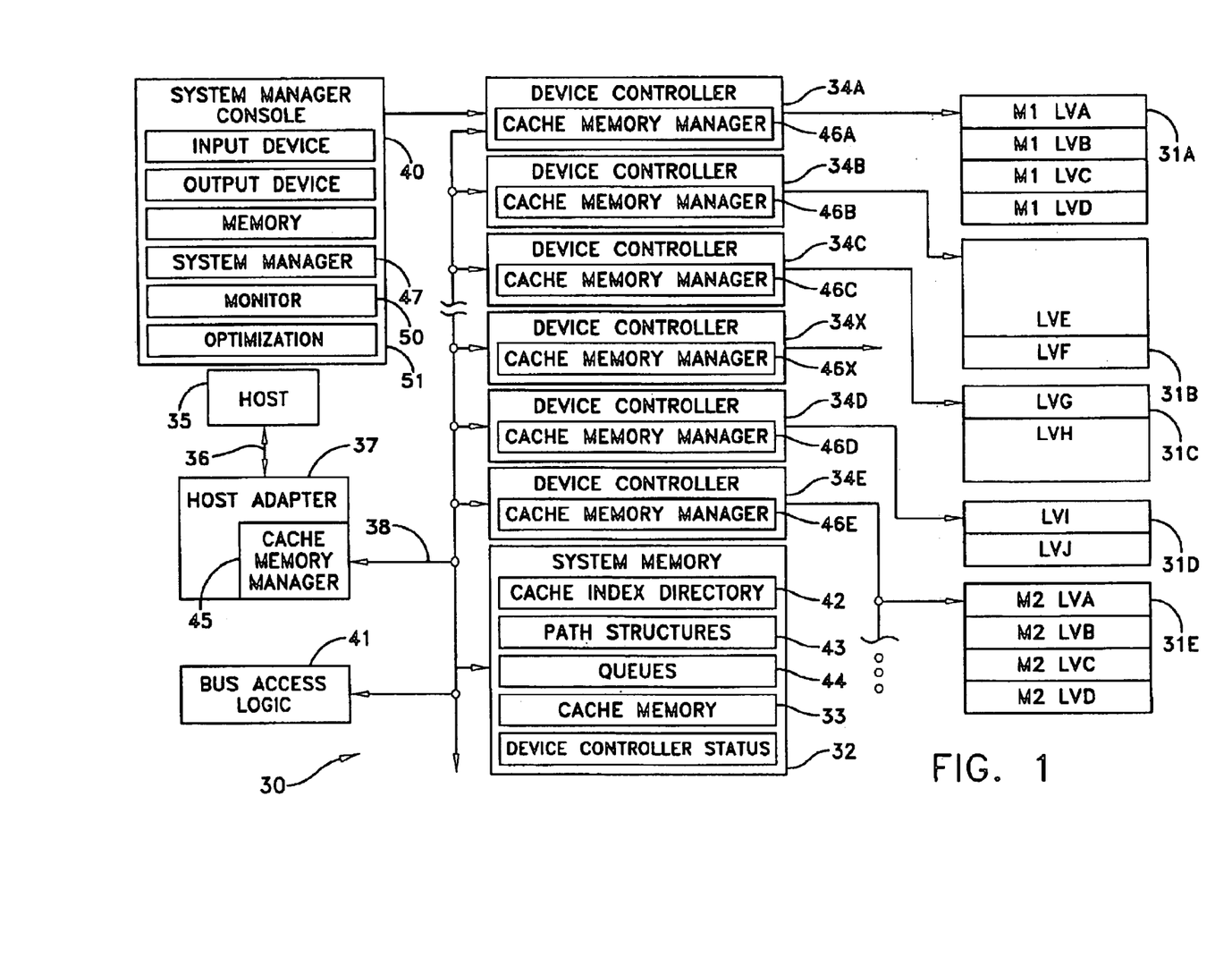
FIG. 1 is a block diagram of a specific data processing system that implements this invention.

FIG. 1 depicts, in block form and as a typical data storage system 30, a Symmetrix 5500 series integrated cached disk array that includes such a data memory system with a number of data storage devices or physical disk drives 31A, 31B, 31C, 31D and 31E, by way of example, and a system memory 32 with a cache memory 33. In this particular embodiment the system 30 includes several device controllers 34A, 34B, 34C, 34D and 34E connected to corresponding ones of the physical disk drives 31A through 31E.

Configuring physical disk drives into logical volumes or analogous data blocks is well known in the art. By way of example, the device controller 34A is shown with an associated physical disk drive 31A divided into the mirrored logical volumes M1-LVA, M1-LVB, M1-LVC and M1-LVD; the device controller 34E controls the other physical disk drive 31E that stores the mirrored logical volumes M2-LVA, M2-LVB, M2-LVC and M2-LVD. It is also possible for logical volumes, such as the LVE and LVF logical volumes on the physical disk 31B, and LVG and LVH logical volumes in the physical disk drive 31C to have different capacities. As will become apparent, this invention has particular use when a physical disk drive has multiple logical volumes.

Still referring to FIG. 1 a single processor or host 35 communicates with the data storage facility through an interconnecting data access channel 36 and a host adapter 37 that connects to the system memory 32 over a system bus 38. A a typical data storage facility 30 may comprise multiple host adapters that connect to the system bus 38 in parallel. One or more hosts may also connect to each host adapter.

A system manager console 40 includes an additional processor that connects to the system bus 38, typically through a device controller, such as device controller 34A by means of a serial or other communications link. Essentially the system manager console 40 enables the operator to establish communications with the host adapter 37, the device controller 34B and the system memory 32. As known, a system manager 47 in the system manager console 40 permits a system operator to run set-up and diagnostic programs for configuring, controlling and monitoring the performance of the data storage facility 30.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables that define a logical device or volume as a group of cylinders, individual cylinders within a logical volume, and individual tracks with a cylinder. The system memory 32 also includes areas for path structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory that retains data elements until they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Pat. No. 5,206,939.

A cache memory manager 45 in the host adapter 37 gathers statistics about a number of parameters. For the purpose of this invention, the numbers of reading and writing operations requested by a host 35 or connected hosts are important. Each of the cache memory managers 46A through 46X in each of the device controllers 34A through 34X gathers statistics for the logical volumes on each connected physical disk storage device. More specifically, each cache memory manager gathers statistics as to the number of disk accesses to each logical volume connected to it. A monitor 50 in the system manager console 40 integrates the data in these cache memory managers to obtain appropriate statistics at given intervals.

From the foregoing, disk operations included in any measure of the loading of a logical volume will include reading operations and writing operations. Reading operations can be further segregated or classified as read-hit, read-miss and sequential read operations. A read-hit operation occurs when the data to be read resides in the cache memory 33. A read-miss occurs when the data to be read is not available in the cache memory 33 and must be transferred from a physical disk device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and be less than the number of writing operations of the first type.

In accordance with this invention, optimization of disk performance relies upon the foregoing information supplied from a performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. An optimization program 51 shown in FIG. 1 then operates according to a procedure 100 as shown in FIG. 2 to establish an exchange of a pair of logical volumes.

Figure 2:
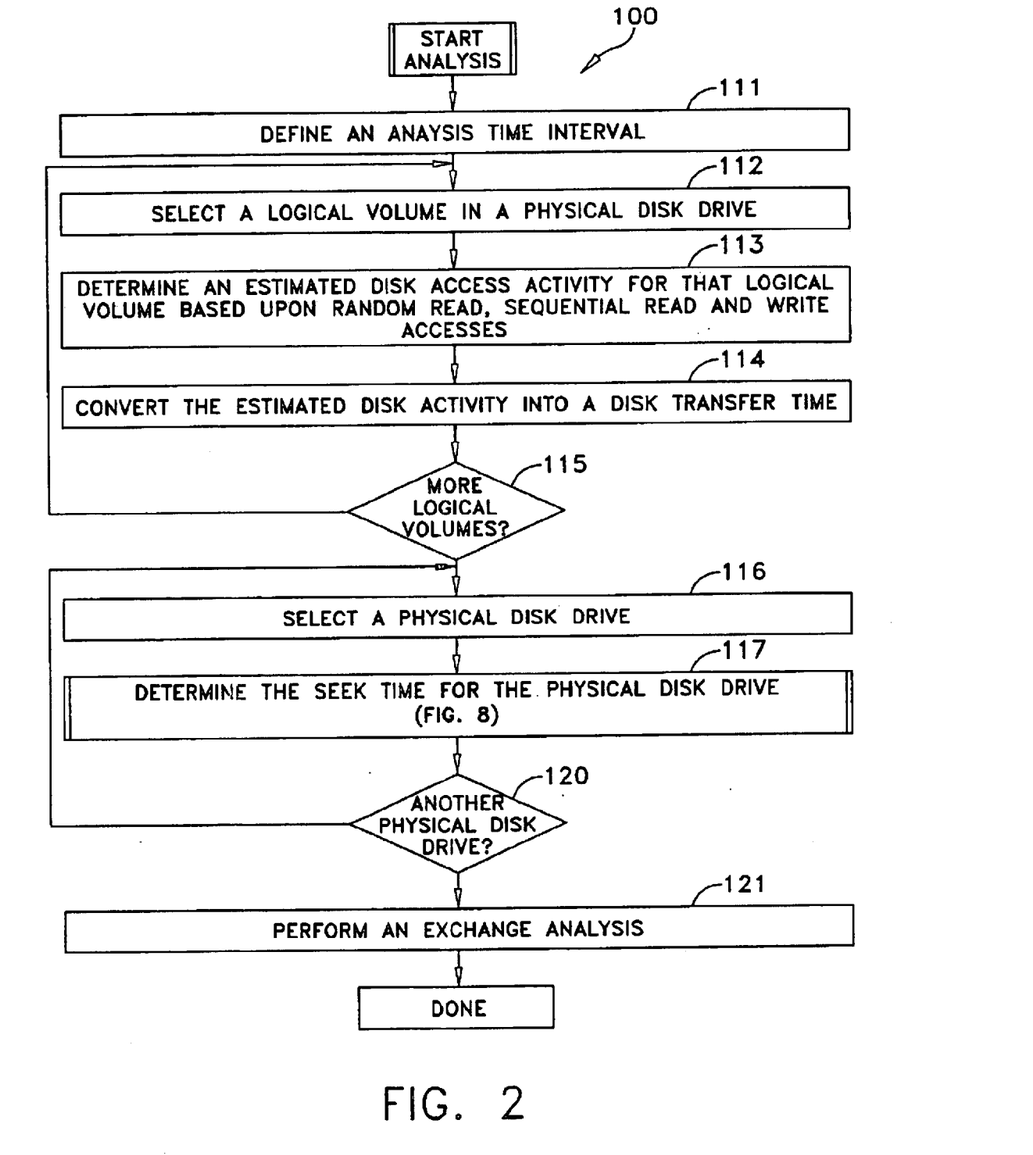
FIG. 2 is a flow diagram that depicts a procedure for exchanging logical volumes that incorporates this invention.

Step 111 in FIG. 2 represents the selection of a particular time interval for analysis. In step 112 the load balance program 51 selects a logical volume or analogous data block of other size or type for analysis. Step 113 obtains the number of disk accesses to the selected logical volume, segregates them into random disk read, disk write and sequential prefetch read categories and generates a weighted estimate. It has been found that weighting this information can improve the estimate, particularly a weighting of 1.0 for random disk reads, 0.5 for disk writes and 0.25 for sequential prefetch reads. Other weightings may also be effective.

The procedure of step 114 converts the weighted disk activity into a disk transfer time representing the time to complete all the transfers to the logical volume exclusive of any seek operations. That is, a disk transfer time will correspond to any latency time plus the time for actually transferring selected data. This conversion can be provided by data contained in a table that represents an average of all systems or specific systems by model and manufacturer. The data may be manufacturer's design data or may reflect specific measurements at one track on a physical disk drive or at a plurality of spaced tracks.

Once this information has been calculated for a particular logical volume or other data block, step 115 determines whether additional logical volumes remain to be tested. If more logical volumes exist, steps 112 through 114 repeat.

After all the logical volumes in all the physical disk drives under analysis have been processed to obtain the disk transfer times, step 115 diverts control to step 116 to begin an analysis that provides seek times for the accesses. Specifically step 116 selects a physical drive for an analysis according to a procedure 117, shown in detail in FIGS. 6 through 8, to obtain a total seek time for the selected physical disk drive. If another physical disk drive requires analysis, step 120 returns control to step 116. Otherwise, control passes from step 120 to step 121 whereupon an exchange analysis begins. That exchange analysis forms no part of this specific invention.

In accordance with this invention the procedure for determining the seek time for a physical disk drive in step 117 is based upon an assumption that each physical disk drive is divided into segments of a given size defined by segment boundaries, notwithstanding the boundaries of any logical volumes on the physical disk drive. For each physical disk drive the segment boundaries are utilized to form a template that is common to all physical disk drives of the same type, notwithstanding the number or sizes of the logical volumes on a particular physical disk drive.

Figure 3:
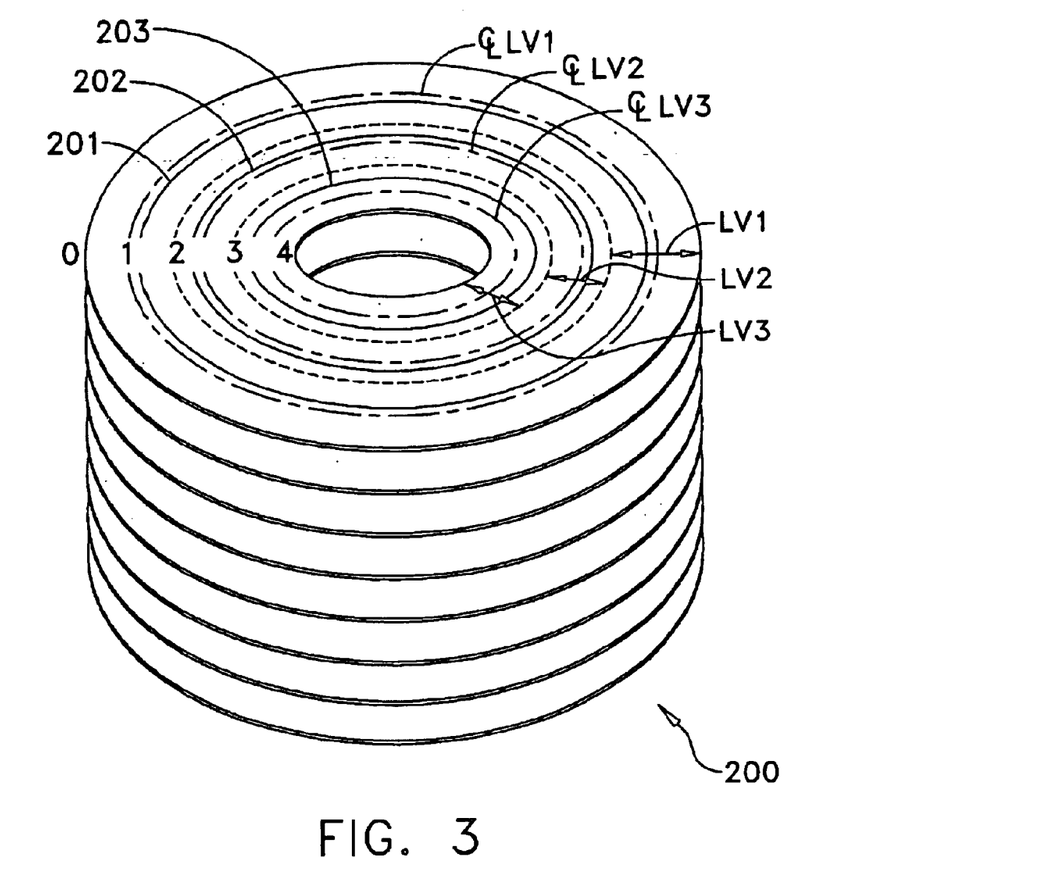
FIG. 3 is a diagram of a physical disk drive.

FIG. 3 depicts a physical disk drive 200. For purposes of discussion the physical disk drive 200 is shown with a capacity of 4 gigabytes (GB) and contains 3 logical volumes designated logical volumes LV(1), LV(2) and LV(3) arranged in bands of concentric cylinders. FIG. 3 depicts the extent and location of each of these logical volumes and their center line addresses. Measured in terms of gigabytes from a starting reference or 0 byte position on the outer track or cylinder of the physical disk drive, the physical disk drive 200 has the following characteristics:

| LV ID | Size (GB) | Starting Address (GB) | Center Line Address (GB) |
|---|---|---|---|
| LV(1) | 1.7 | 0 | 0.85 |
| LV(2) | 1.0 | 1.7 | 2.20 |
| LV(3) | 1.3 | 2.7 | 3.35 |

Concentric lines 201, 202 and 203 depict the 1, 2 and 3 GB boundaries for the 1 GB segments in the physical disk drive 200 shown in FIG. 3.

Figure 4:
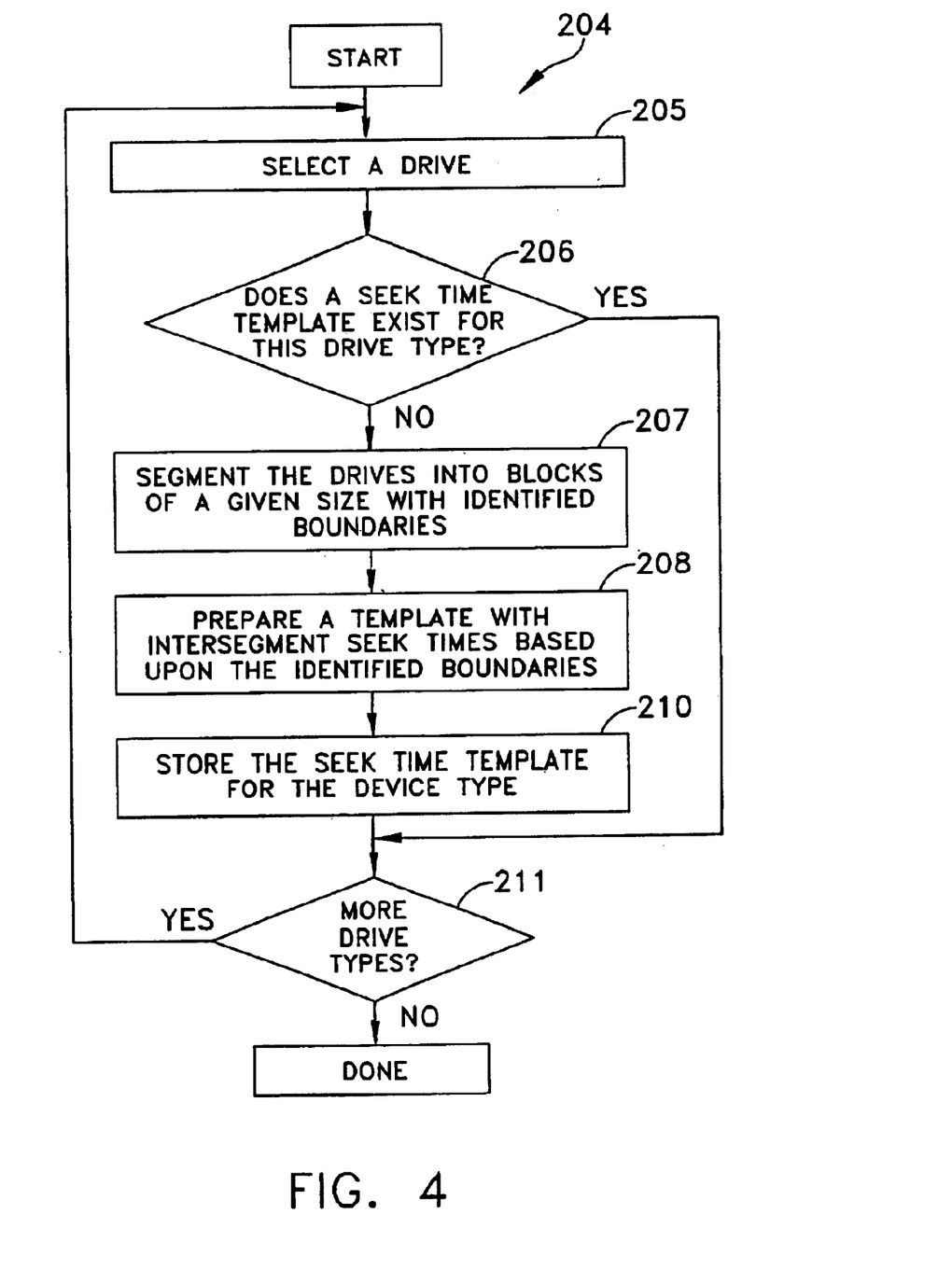
FIG. 4 is a flow diagram that depicts one aspect of this invention.

This invention utilizes a template that increases the accuracy of the estimates of seek time during an analysis. FIG. 4 depicts a procedure 204, usually run when the installation of the optimization procedure 51 occurs or whenever a new drive type is added to the disk storage facility. Specifically the procedure 204 begins by selecting a drive type in step 205, such as the 4 GB physical disk drive in FIG. 3. If a seek time template does not exist, step 206 transfers control to step 207.

Step 207 segments the drive into blocks of a given size with identified boundaries. The actual selection of the segment boundaries will depend upon the data that is available for determining seek times. For this particular example, it is assumed that step 207 segments the physical disk drive 200 into 1 GB segments with boundaries at 0, 1, 2, 3 and 4 GB as defined above. As will be apparent from FIG. 3, when the LV(1), LV(2) and LV(3) logical volumes are present, the LV(1) logical volume spans all of the first segment and a portion of the second segment; the LV(2) logical volume, portions of the second and third segments; and the LV(3) logical volume, a portion of the third segment and all of the fourth segment. It will be further noted that the center lines for the LV(1) through LV(3) logical volumes are located in the first, third and fourth segments respectively.

Figure 5A:
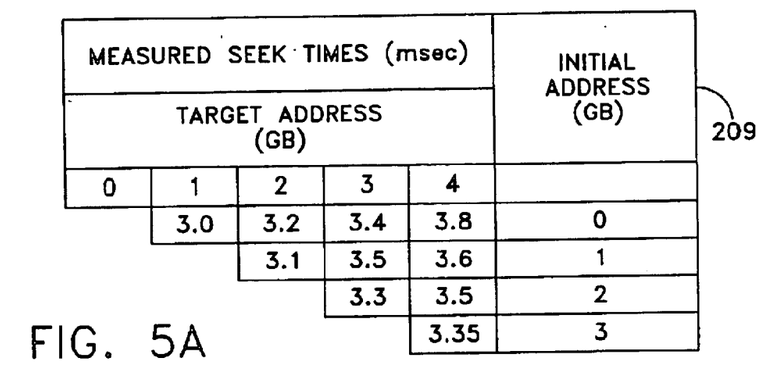
FIGS. 5A, 5B and 5C are diagrams that are useful in understanding this invention.

Step 208 prepares a template with empirical predetermined seek times based upon the identified boundaries. FIG. 5A depicts one such template 209 with recorded seek times for moving disk read/write heads between each of the boundaries. It is assumed that the seek times for a physical disk drive are symmetrical; that is, it is assumed that the time to go from one boundary to another is the same as going from the other boundary to the one boundary. In the foregoing example, there is a 3 msec. seek time involved from transferring from the 0 GB boundary to 1 GB boundary; and a like 3 msec. seek time is involved in moving from the 1 GB to the 0 GB boundary. Seek times to such boundaries generally are available from manufacturers. Alternatively these times can be obtained by test. As shown in FIG. 5A, a seek from the 0 boundary to the 1 boundary is 3 msec. As is predictable, the times to transfer to successfully more distant boundaries increases.

Step 210 stores the seek time template 209 for the device type. In one embodiment the template is stored within data buffer space provided within the load balance system 51. Obviously this template could be stored in any accessible storage location in the data storage facility 30 shown in FIG. 1. If more drive types exist, step 211 shifts control back to step 205 to select another drive type. When seek time templates have been produced for all the drive types, the procedure 204 in FIG. 4 terminates and the installation procedure can be completed. If a physical disk drive of a new type is added subsequently, this procedure 204 can be implemented to generate and save an additional corresponding seek time template.

This invention uses the foregoing seek time template in FIG. 5A to determine the seek time for two different types of seek operations. A first type involves starting and ending addresses in different logical volumes. In the following discussion, such seek operations are called "intervolume seek operations". The second type involves seek operations with starting and ending address in the same logical volume. These are called "intravolume seek operations". Looking first at an intervolume seek operation, it will be apparent that the maximum number of possible logical volume pairs on any physical disk drive with symmetrical operating characteristics will be:

$$N * \frac{(N-1)}{2} \tag{1}$$

where N represents the total number of logical volumes on the physical disk drive that are available for analysis. Thus in the specific embodiment shown in FIG. 3 there are three possible logical volume pairs, namely: an LV(1)–LV(2) pair; an LV(1)–LV(3) pair; and an LV(2)–LV(3) pair. The available number of logical volume pairs may be decreased if any one logical volume is excluded from the analysis. If a physical disk drive has only one available logical volume, there will be no available logical volume pairs.

Figure 6:
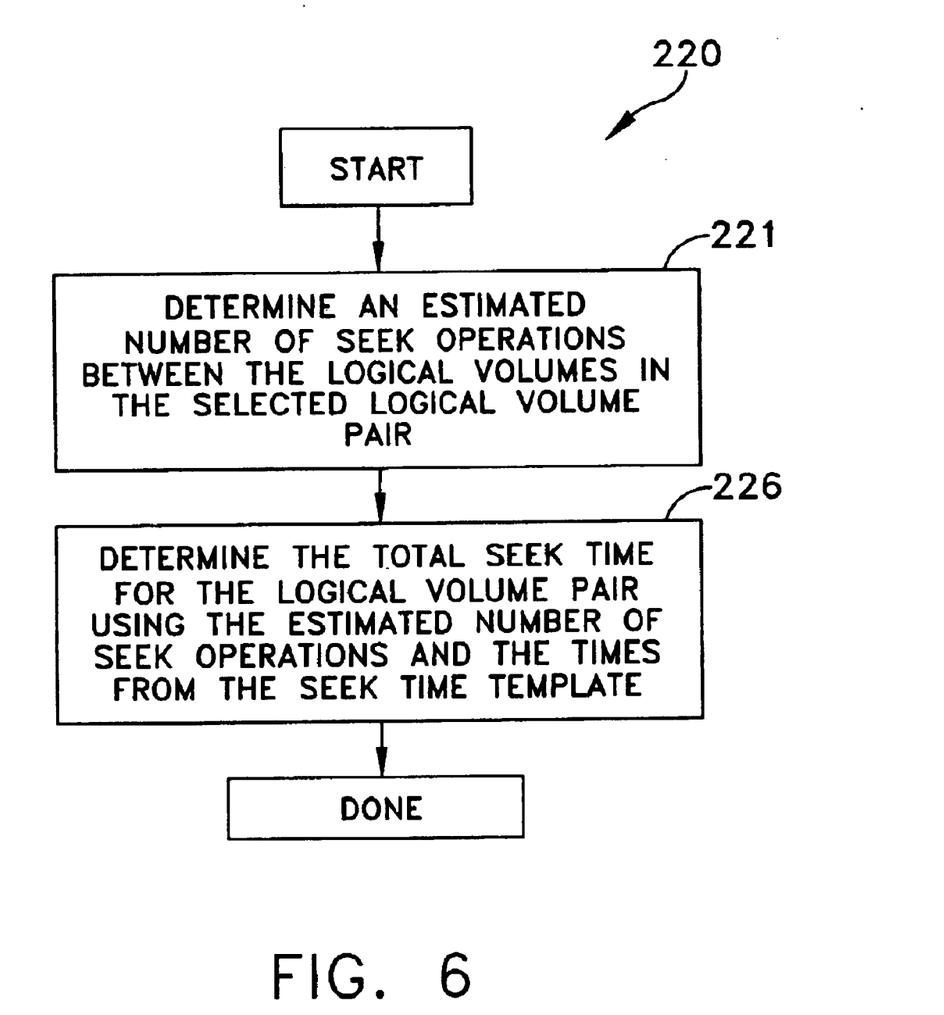
FIG. 6 is a flow diagram that depicts a process for obtaining an intervolume seek time.

An intervolume seek procedure 220 in FIG. 6 provides the seek time for a logical volume pair (i,j). Step 221 determines an estimated number of seek operations between the logical volumes in the selected logical volume pair. In a preferred form, the number of accesses are weighted as previously described. The estimated number of seek operations is provided by:

$$Nr \text{ seeks}(i, j) = 2 * \frac{A_i A_j}{A} \tag{2}$$

where $A_i$ and $A_j$ represent the weighted number of accesses to the two different logical volumes i and j in a logical volume pair, namely: logical volumes i and j and where i<>j and A represents the total weighted seek activity on the physical disk.

As will be apparent from FIG. 3, it is likely that neither the boundaries for or a center line location of a logical volume will match one or more segment boundaries. In accordance with this invention, an interpolation based upon the Ratio Theorem provides an efficient procedure for obtaining seek times between logical volume center line locations with greater accuracy than available in prior systems and without imposing an undue burden on processing.

Figure 5B:
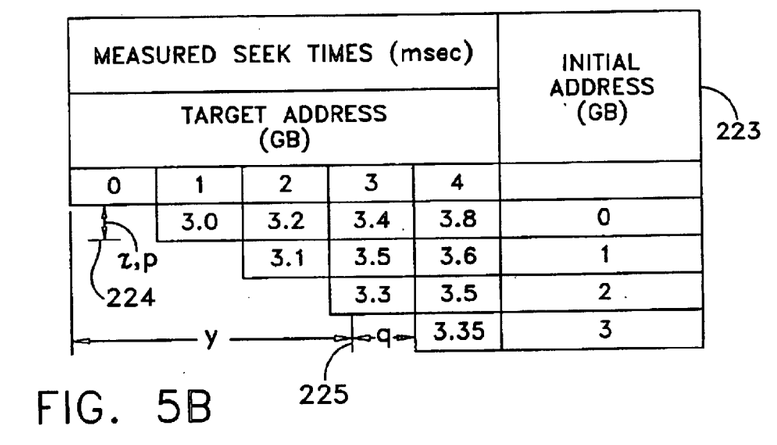

Assume that the LV(1)–LV(3) logical volume pair is selected for analysis, as disclosed in the above table and FIG. 3, this particularly configured physical disk drive 200 has the center line locations at 0.85 GB for the LV(1) logical volume and 3.35 GB for the LV(3) logical volume. Assuming the initial and target addresses are the 0.85 GB and 3.35 GB centerline locations, the table 223 in FIG. 5B depicts those two locations by lines 224 and 225, respectively. Letting x and y represent the center line locations of the LV(1) and LV(3) logical volume lines, then:

$$x = 0.85 \tag{3}$$

and $$y = 3.35. \tag{4}$$

Let $$p = x - \lfloor x \rfloor \tag{5}$$

and $$q = \lceil y \rceil - y \tag{6}$$

where $\lfloor x \rfloor$ and $\lceil y \rceil$ are the "floor of x" and the "ceiling of y", mathematical functions, respectively. Consequently p and q represent the displacements of the center line addresses for each logical volume relative to a segment boundary. Looking at the specific example:

$$x=0.85, \lfloor x \rfloor = 0$$

$$y=3.35 \lceil y \rceil = 4 \quad (4)$$

so that $$p=x-\lfloor x \rfloor = 0.85-0=0.85$$

$$q=\lceil y \rceil - y = 4-3.35 = 0.65 \quad (8)$$

Using the Ratio Theorem and a syntax time (row, column), the interpolation for the seek time for the specific logical pair, $t_{i,j}$ is:

$$t_{i,j} = pq \text{ time}(\lfloor x \rfloor+1, \lceil y \rceil-1) + p(1-q)\text{time}(\lfloor x \rfloor+1, \lceil y \rceil) + (1-p)q \text{ time}(\lfloor x \rfloor, \lceil y \rceil-1) + (1-p)(1-q)\text{time}(\lfloor x \rfloor, \lceil y \rceil) \quad (9)$$

For the specific example, Equation (9) yields a value rounded up to two decimal places of:

$$t_{1,3} = 3.54 \text{ msec} \quad (10)$$

This value becomes the characteristic seek time that is one term in the product for determining the total seek time for transfers between the two logical volumes in the selected logical volume pair over the interval.

Step 226 utilizes the resulting number of seeks obtained from Equation (2) and the characteristic seek time from equation (9) to generate the total time for seek operations with the logical volume pair. That is, for a specified logical volume pair i,j, the seek time, seek time(i,j) is:

$$\text{Seek time}(i,j) \frac{A_i A_j}{A} = t_{i,j} \quad (11)$$

Thus steps 220 and 226 provide a total seek time over the analysis interval for a logical volume pair (i,j).

There are two specific intervolume seek operations in which individual terms of equation (9) can not be solved using the data in a seek time template as shown in FIG. 5A. One situation occurs when the centerline locations of two logical volumes in a selected logical volume pair lie in the same segment. In that situation, the second and third terms of equation (9) can not be solved because there is no corresponding data. The second arises when the centerline locations for the two logical volumes lie in consecutive segments. In that case the first term of equation (9) can not be solved. Either situation requires additional information. When these situations occurs, step 226 in FIG. 6 generates x and y values based upon an extrapolation of the data in a disk seek time template, such as the disk seek time template 209 in FIG. 5A. Using k to represent a single segment number so that i=j=k and M to represent the maximum segment number:

For 0<k<M, $$\text{time}(k,k) = \text{time}(k-1,k) + \text{time}(k,k+1) - \text{time}(k-1,k+1) \quad (12)$$

For k=0, $$\text{time}(0,0) = 2^*\text{time}(0,1) - \text{time}(0,2) \quad (13)$$

and

For k=M, $$\text{time}(M,M) = 2^*\text{time}(M-1,M) - \text{time}(M-2,M). \quad (14)$$

Figure 5C:
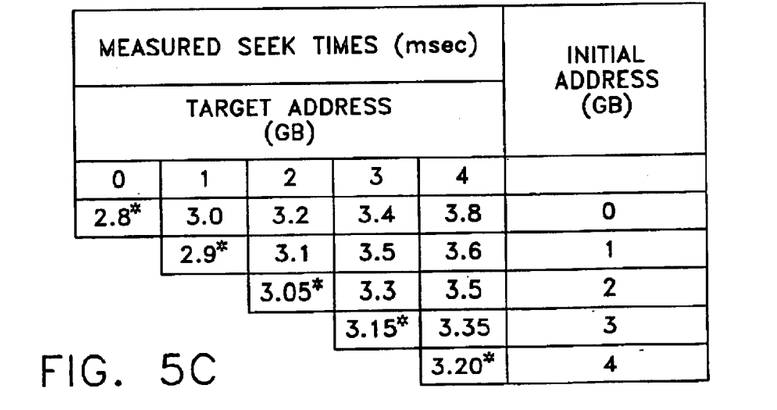

Step 226 uses one of this set of three equations to provide an appropriate value for the interpolation of the seek time. In the specific example shown in FIGS. 3 and 5A, equation (12) provides seek times for the segment with boundaries at 1 and 2 GB and with boundaries at 2 and 3 GB. Equation (13) provides the seek time for the first segment between the 0 and 1 GB boundary; equation (14), the seek time for the other end segment with boundaries at 3 and 4 GB. The times followed by asterisks (*) in FIG. 5C depict times determined by equations (12) through (14) for the specific seek time template in FIG. 5A. In a preferred embodiment, these values are calculated on an "as needed" basis. Alternatively, these values could be generated as part of the step of forming a drive type seek time template and stored as part of that template.

Figure 7:
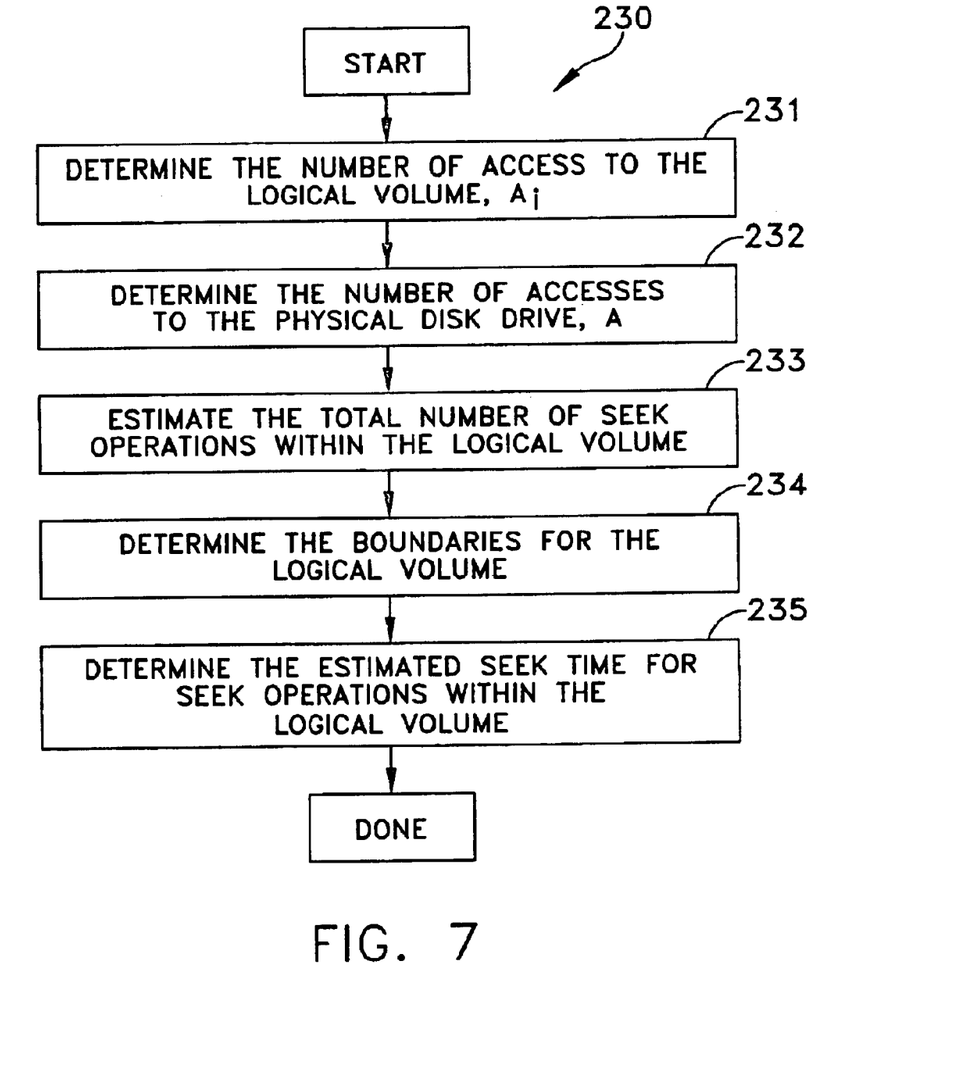
FIG. 7 is a flow diagram that depicts a process for obtaining an intravolume seek time.

FIG. 7 depicts a procedure 230 for estimating the seek time for intravolume seek operations in a selected logical volume i. For purposes of explanation and understanding, assume that the LV(2) logical volume shown in FIG. 3 has been selected.

Step 231 obtains appropriate data from the system manager 40 in FIG. 1 to determine the weighted number of accesses to the logical volume and step 232 uses a similar process to determine the weighted number of accesses to the entire physical disk drive 200 in FIG. 3. Letting $A_i$ represent the weighted number of accesses to the logical volume and A represent the weighted number of accesses to the physical disk drive, step 233 estimates the total number of intravolume seek operations within the logical volume as:

$$Nr \text{ internal seeks} = \frac{A_i^2}{A} \quad (15)$$

Step 234 determines the boundary locations on the physical disk drive for the selected logical volume. For the specific instance of the LV(2) logical volume, the boundaries are at 1.7 GB and 2.7 GB. Step 235 uses this information to determine the estimated seek time according to:

$$\text{Seek time}(i) = K^* Nr \text{ internal seeks}^* t(i,i) \quad (16)$$

where K is a constant and t(i,i) is obtained from equation (9) where i=j and where x and y are logical volume boundaries. In the specific example, x=1.7 and y=2.7.

For intravolume seek operations with the selection of the boundaries, $t_{seek}(i,i)$ is taken between the starting and ending locations for the logical volume. However, the exact extent of any seek operation may be from a minimum between two adjacent cylinders to a maximum between the starting and ending locations. Information obtained from experimentation indicates that a value K=⅓ scales the total seek time to a more accurate value. Thus, equation (16) provides an accurate estimate of the seek time for seek operations that are confined to a specific logical volume.

Figure 8:
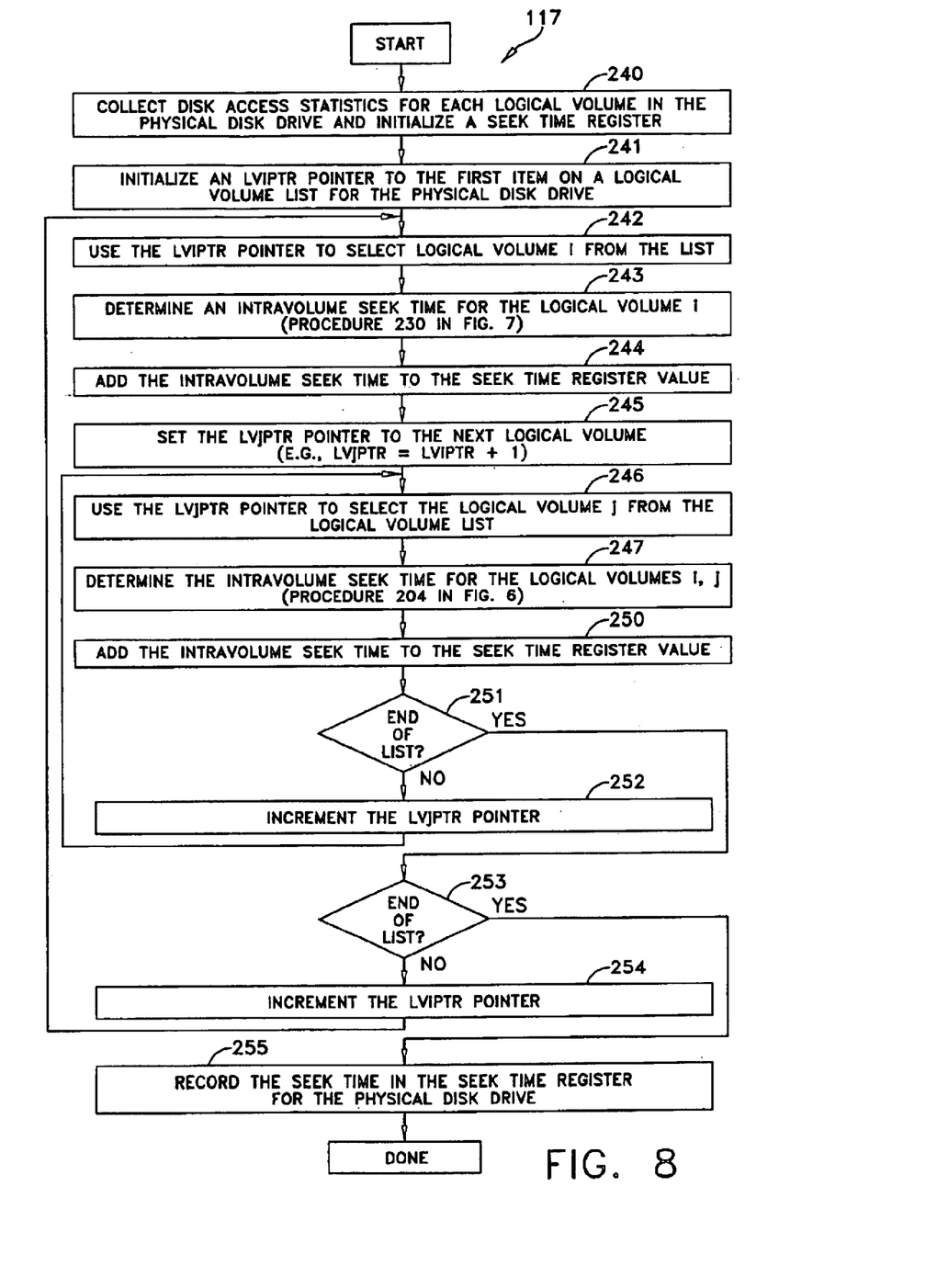
FIG. 8 is a flow diagram that depicts a procedure incorporated in the procedure of FIG. 2 for obtaining the total seek time for a physical disk drive using the procedures shown in FIGS. 6 and 7.

FIGS. 6 and 7 therefore depict procedures for obtaining an intervolume seek time for a specific logical volume pair and an intravolume seek time for a specific logical volume. FIG. 8 depicts a procedure that integrates these two seek time procedures and that is called by step 117 in FIG. 2. Referring to FIG. 8, the procedure begins in step 240 with the collection of the disk access statistics from the monitor 50 in FIG. 1. As previously indicated, this information collectively identifies each disk access by logical volume and types. Step 240 also initializes a seek time register (not shown). The seek time register accumulates seek time data for the physical disk drive to be used during the exchange analysis 121 in FIG. 2.

As will become evident, it is only necessary to analyze the intervolume seek times for each logical volume pair. Any number of procedures can be used to avoid duplication. In one approach depicted in FIG. 8, the logical volumes on a physical disk drive are ordered by their position on the drive. For example, the order of the logical volumes in FIG. 3 would be LV1, LV2, LV3. In this particular case the sequence of names corresponds to the order, but the logical volume names and the sequence with which they appear are arbitrary.

Step 241 defines an LViPTR pointer and initializes it to point to the first logical volume in the ordered sequence. In the example of FIG. 3, the LViPTR pointer points to the LV1 logical volume.

Step 242 selects the logical volume i from the available logical volumes. Step 243 then applies the procedure 230 in FIG. 7 to accumulate the relevant seek statistics and to obtain the intravolume seek time for the selected logical volume i. Step 244 adds this seek time to the any accumulated time in the seek time register for this physical disk drive.

Step 245 then initializes an LVjPTR pointer to point to the next logical volume in the ordered sequence. For a first iteration, the LViPTR pointer points to the LV1 logical volume in FIG. 3, so step 245 sets the LVjPTR pointer to point to the LV2 logical volume, and step 245 completes the definition of a logical volume pair. In the initial iteration, step 245 defines the LV1–LV2 logical volume pair. Step 246 then selects the logical volume identified by the LviPTR pointer and obtains the relevant seek statistics. Step 247 uses procedure 204 in FIG. 6 to determine the intervolume seek time for the logical volume pair (i,j); i.e., the LV1–LV2 *logical volume pair during the first iteration. Step 250 adds this seek time to the value in the seek time register.

Step 251 tests to see if the LVjPPT pointer identifies the last logical volume in the ordered sequence. If not, step 252 increments the LVjPTR to point to a next logical volume for being paired with the logical volume identified by the LViPTR pointer and transfers to step 246 to select that logical volume and the statistics for the logical volume pair; e.g., for the LV1–LV3 logical volume pair.

After evaluation all the possible logical volume pairs in which the first logical volume in the ordered sequence is a member, step 251 transfers control to step 253 determines whether the LViPTR pointer identifies the last logical volume in the ordered sequence. If not, step 254 increments the LViPTR pointer. This establishes a reference to the LV2 logical volume after all the possible LV logical volume pairs are evaluated and control transfers to step 242 to select the next logical volume and its seek statistics.

For the specific example of FIG. 3, FIG. 8 will produce seek times for individual logical volumes and logical volume pairs in the following sequence:

LV1; LV1–LV2; LV1–LV3; LV2; LV2–LV3; LV3

Other sequences could also be generated by other techniques.

When all logical volumes are tested, step 253 transfers control to step 255 that records the value in the seek time register in a memory location assigned to the selected physical disk drive. That is, after step 255 this assigned memory location will contain a value for the total seek time for the physical disk drive that is given by:

$$DriveSeekTime = \sum_{i<j} \text{Seek time } (i, j) + \sum_{i} \text{Seek time } (i, i) \quad (17)$$

As will now be appreciated, using fixed size segments allows the generation of a seek time template that is independent of the logical volume configuration on a particular physical disk drive of a given drive type. Many systems that comprise multiple disk drives include physical disk drives of a single type in which case only one such template is required. The 4 GB physical disk drive with 1 GB segments has been selected because it simplifies the description of the invention. In most applications the physical disk drive will have a greater storage capacity and may include any number of logical volumes. The segment sizes may also differ.

The process of obtaining seek times in accordance with this invention occurs with only a minimal impact on processing within the system. That is, reading the size of each logical volume, calculating its center line and performing the interpolation as set forth in Equations (3) through (10) only requires minimal processing time but improves the analysis of the seek times.

In summary, this foregoing disclosure defines a method for determining seek times that is useful in optimizing the performance of a disk storage facility comprising a plurality of physical disk drives. Statistics of the occurrence of read, write, and sequential prefetch read operations are maintained over at least an analysis interval. This information becomes an estimated access number for each logical volume. In turn this information produces an estimated number of seeks between individual logical volumes in logical volume pairs. Using a center location for each logical volume as a reference and a drive seek time template enables a rapid, straightforward and more accurate determination of the seek time for each logical volume pair. These times are easily combined to produce a total seek time for the analysis interval for the physical disk drive.

The foregoing description discusses this invention in terms of data organized into blocks of contiguous storage locations on a physical disk of known size called logical volumes. However, the invention is applicable to other data organizations. In some applications, for example, a logical volume might be divided into a series of sub-volumes distributed across plural physical disk storage devices or other logical blocks. Such a division could be made for redundancy and recovery purposes or for load distribution purposes.

Although this invention has been disclosed in terms of certain embodiments, many modifications can be made to the disclosed method and supporting data organization without departing from the invention. Therefore, it is the intent of the appended claims to cover all such variations and modifications as come within the true spirit and scope of this invention.

What is claimed as new and desired to be secured by Letters Patent of the United States is:

1. A method for determining a seek time required for moving a disk head between first and second addresses on a physical disk drive including multiple logical volumes, said method comprising the steps of:

A) dividing the disk into a plurality of segments, each segment having a given size and being defined by first and second boundaries of a plurality of contiguous tracks, B) establishing an array of actual seek times for seek operations between each segment pair based upon the first and second boundaries, C) generating a seek time for disk head movement between the first and second addresses by linearly interpolating the array of actual seek times based upon the first and second addressed, said interpolation being based on a Ratio Theorem analysis using a center location of each segment as the reference location for disk seek operating between different logical volumes.

2. A method as recited in claim 1 wherein said interpolation uses the boundaries of a logical volume to obtain a disk seek time for seek operations within the logical volume.

3. A method for determining the seek time over a time interval for a physical disk drive configured to store data in a plurality of logical volumes, said method comprising the steps of:
   A) dividing the physical disk into a plurality of fixed sized segments independently of the logical volume configuration on the physical disk drive wherein each segment has a plurality of contiguous tracks,
   B) determining actual seek times for seek operations between the segments by,
      i) assigning a predetermined seek time for each seek operation between two segment boundaries,
      ii) calculating an intrasegment seek time based upon the predetermined seek times, and
      iii) placing the predetermined seek times in a two-dimensional array with the rows and columns defined by the segment boundaries,
   C) accumulating statistics for each access to each logical volume during the time interval,
   D) converting the accumulated statistics into an estimated number of seeks between each pair of logical volumes,
   E) defining a seek time for each logical volume pair based upon said actual segment seek times, and
   F) generating a total seek time as the sum of the products, for each logical volume pair, of the actual seek time for and the estimated number of seeks between each logical volume in the logical volume pair over the time interval.

4. A method as recited in claim 3 wherein said accumulation of statistics includes segregating each access to a logical volume into one of predetermined classes of accesses and weighting the numbers of accesses in each predetermined class.

5. A method as recited in claim 4 wherein said segregation of accesses is into one of random read, write and sequential prefetch read classes with weightings of 1.0, 0.5 and 0.25, respectively.

6. A method as recited in claim 5 wherein $A_i$ and $A_j$ represent the weighted access to logical volumes i and j, and A represents the weighted sum of all the accesses to the physical disk drive and wherein the estimated number of disk accesses for the logical volume pair being given by:

$$Nr \text{ seeks}(i, j) = \frac{A_i A_j}{A}.$$

7. A method as recited in claim 3 wherein said determination of each actual seek time comprises determining the seek time between a center location of each of the logical volumes in the logical volume pair.

8. A method as recited in claim 7 wherein said determination of each actual seek time includes interpolating the seek times determined for seek operations between the segments based upon the center locations.

9. A method as recited in claim 7 wherein said determination of each actual seek time includes the step of linearly interpolating the seek times determined for seek operations between the segments based upon the center locations.

10. A method as recited in claim 7 wherein $A_i$ and $A_j$ represent the weighted access to logical volumes i and j, respectively, and A represents the weighted sum of all the accesses to the physical disk drive and wherein the estimated seek time for the logical volume pair is given by:

$$\text{Seek time}(i, j) = t_{i,j} \frac{A_i A_j}{A}.$$

11. A method as recited in claim 3 additionally comprising the step of determining an intravolume seek time within a logical volume.

12. A method as recited in claim 11 wherein said determination of intravolume seek time for a logical volume includes defining the boundaries of the logical volume relative to the segment boundaries and determining the seek time between the logical volume boundaries.

13. A method as recited in claim 12 wherein said definition of intravolume seek time includes interpolating the seek times determined for seek operations between the segments based upon the logical volume boundary locations.

14. A method as recited in claim 12 wherein said definition of seek time includes the step of linearly interpolating the seek times determined for seek operations between the segments based upon the logical volume boundary locations.

15. A method for determining the seek time over a time interval for a physical disk drive configured to store data in a plurality of logical volumes, said method comprising the steps of:
   A) dividing the physical disk into a plurality of fixed sized segments characterized by boundaries independently of the logical volume configuration on the physical disk drive,
   B) determining seek times for seek operations between the segments by assigning empirically derived seek times between two segment boundaries,
   C) accumulating statistics for each access to each logical volume during the time interval,
   D) converting the accumulated statistics into an estimated number of seeks between each pair of logical volumes by weighting the numbers of accesses in each of different predetermined classes,
   E) defining a seek time for each logical volume pair based upon said segment seek times by using the center locations of each logical volume to interpolate the seek times determined for seek operations between the segments, and
   F) generating a total seek time that is the sum of the seek times for each logical volume pair obtained as a function of the estimated number of seeks and the defined seek time for the logical volume pair.

16. A method as recited in claim 15 wherein each of said center locations is given as an offset from a segment boundary according to:

$$p = x - \lfloor x \rfloor$$

and $$q = \lceil y \rceil - y$$

where x and y represent center line locations of logical volumes, $\lfloor x \rfloor$ and $\lceil y \rceil$ represent "floor of x" and "ceiling of y" functions for the values of x and y based upon the boundaries of the segments and p and q represent the displacements of the center line addresses for each logical volume relative to a segment boundary.

17. A method as recited in claim 16 wherein said definition of seek time for each logical volume includes the step of generating a seek time according to:

$$t_{i,j}=pq\,\text{time}(\lfloor x \rfloor+1,\lceil y \rceil-1)+p(1-q)\text{time}(\lfloor x \rfloor+1,\lceil y \rceil)+(1-p)q\,\text{time}(\lfloor x \rfloor,\lceil y \rceil-1)+(1-p)(1-q)\text{time}(\lfloor x \rfloor,\lceil y \rceil) \quad (9)$$

where $t_{i,j}$ represents the seek time for a specific pair of logical volumes and time is the seek interval for the corresponding relationship.

18. A method for determining the seek time over a time interval for a logical volume on a physical disk drive configured to store data in at least one logical volume, said method comprising the steps of:
   A) dividing the physical disk into a plurality of fixed sized segments independently of the logical volume configuration on the physical disk drive,
   B) determining seek times for seek operations between the segments by assigning empirically derived seek times between two segment boundaries,
   C) accumulating statistics for each access to the logical volume during the time interval,
   D) converting the accumulated statistics into an estimated number of seeks between locations within the logical volume by weighting the numbers of accesses in each of different predetermined classes,
   E) defining a seek time for the logical volume pair based upon said segment seek times by using the boundary locations of the logical volume to interpolate the seek times determined for seek operations between the segments, and
   F) generating a total logical volume seek time that depends upon the number of accesses to the logical volume and the seek times between the boundary locations for the logical volume.

19. A method as recited in claim 18 wherein each of the boundary locations is given as an offset from a segment boundary according to:

$$p=x-\lfloor x \rfloor$$

and $$q=\lceil y \rceil-y$$

where x and y represent center line locations of logical volumes, $\lfloor x \rfloor$ and $\lceil y \rceil$ represent "floor of x" and "ceiling of y" functions for the values of x and y based upon the boundaries of the segments and p and q represent the displacements of the center line addresses for each logical volume relative to a segment boundary.

20. A method as recited in claim 19 wherein said definition of seek time for intravolume seeks includes the step of generating a seek time according to:

$$t_{i,j}=pq\,\text{time}(\lfloor x \rfloor+1,\lceil y \rceil-1)+p(1-q)\text{time}(\lfloor x \rfloor+1,\lceil y \rceil)+(1-p)q\,\text{time}(\lfloor x \rfloor,\lceil y \rceil-1)+(1-p)(1-q)\text{time}(\lfloor x \rfloor,\lceil y \rceil) \quad (9)$$

where $t_{i,j}$ represents the seek time for a specific pair of logical volumes and time is the seek interval for the corresponding relationship.

* * * * *